United States Patent [19]
Stuart

[11] Patent Number: 5,617,932
[45] Date of Patent: Apr. 8, 1997

[54] TREE STAND SHROUD

[76] Inventor: Bobby R. Stuart, 3000 Van Noppen Rd., Greensboro, N.C. 27406

[21] Appl. No.: 314,670

[22] Filed: Sep. 29, 1994

[51] Int. Cl.⁶ ................................................. A01M 31/00
[52] U.S. Cl. ............................ 182/187; 182/135; 182/129
[58] Field of Search ................................ 182/187, 188, 182/129, 133, 136, 135, 138, 230; 135/901, 90, 119, 117; 43/1

[56] References Cited

U.S. PATENT DOCUMENTS

| | | | |
|---|---|---|---|
| 3,116,808 | 1/1964 | Riley | 182/129 |
| 3,220,766 | 11/1965 | Kates | 182/116 |
| 3,358,789 | 12/1967 | Laun | 182/129 X |
| 3,464,430 | 9/1969 | McQuaid | 135/90 |
| 3,485,320 | 12/1969 | Jones | 182/129 |
| 3,990,536 | 11/1976 | Wilburn | 182/129 X |
| 4,134,474 | 1/1979 | Stavenau et al. | 182/116 X |
| 4,246,981 | 1/1981 | Stavenau | 182/129 X |
| 4,473,087 | 9/1984 | Cavender | 135/901 X |
| 4,922,942 | 5/1990 | Schaeffer | 135/90 |
| 5,038,889 | 8/1991 | Jankowski | 182/129 |
| 5,295,556 | 3/1994 | Mullin | 182/116 X |
| 5,398,779 | 3/1995 | Meyer | 182/136 X |

*Primary Examiner*—Alvin C. Chin-Shue

[57] ABSTRACT

A shroud is presented for use in combination with a conventional climbable type tree stand which enjoys widespread usage among deer hunters. The shroud is formed from a flexible camouflage fabric and can be easily folded into a small package for carrying by the hunter. The shroud includes Velcro type fasteners along the top edge for releasably attaching the shroud to the tree stand. A draw cord along the bottom edges allows the shroud to be closely gathered around the footrest section of the tree stand to prevent deer or other game animals from being frightened by inadvertant movement of the hunter.

13 Claims, 3 Drawing Sheets

TREE STAND SHROUD

BACKGROUND OF THE INVENTION

1. Field of the Invention

The invention herein pertains to tree stands as used by hunters and particularly to a shroud which partially covers the hunter and encloses the tree stand during use.

2. Description of the Prior Art and Objectives of the Invention

With the increase in game hunting in recent years, deer and other animals have seemingly become more aware of foreign objects and movements therefrom and thus hunters now have fewer chances of obtaining clean shots at game animals. In the past, it was not uncommon in certain areas of the country to obtain several shots at game animals during a day's hunting. Today however, a hunter may be fortunate in some areas of the country to obtain a single shot at a deer after spending eight or more hours in a tree stand. Deer and other game animals have excellent eyesight for detecting movement and an awaiting hunter in a tree stand may inadvertently move his feet or slightly change his sitting position which will cause an approaching deer to retreat. Sitting or standing perfectly still in a tree stand for long hours is virtually impossible, yet many hunters, after long waits, accidentally scare the game without realizing that their slight voluntary or involuntary body movements are the cause.

Some deer stands in the past have been built with a roof and curtain to help shield the hunter from view. Other types of blinds have been utilized for deer and turkey hunting which have proved effective under certain conditions. However, such prior art devices have not been useful for concealing hunters utilizing a climbable tree stand as are conventional in the industry. Also, such prior art curtains and blinds have not been gatherable at the bottom to provide proper concealment of lower body movements of the hunter.

Thus, with the disadvantages and problems associated with prior art tree stand blinds and concealment devices, the present invention was conceived and one of its objectives is to provide a shroud which can be used in combination with a climbable tree stand to better conceal a hunter's movement.

It is also an objective of the present invention to provide a camouflage type shroud which can be easily attached and released from a climbable tree stand with ease and convenience.

It is yet another objective of the present invention to provide a portable shroud which can be easily folded for transportation and which can be easily unfolded and attached to the tree stand for securement in place by upper tie cords and a lower draw cord.

Various other objectives and advantages of the present invention will become apparent to those skilled in the art as a more detailed description is set forth below.

SUMMARY OF THE INVENTION

A shroud is used in combination with a conventional climbable tree stand to shield a hunter's feet and lower body movement from the view of game animals. The shroud consists of a flexible panel such as formed from segments of woven camouflage fabric, camouflage netting or the like. The flexible panel is arcuately shaped to attach to the climbable tree stand by releasable hook and loop (Velcro) fasteners positioned along its top edge. Once the tree stand has been positioned by the hunter at a suitable height along the tree trunk, a pair of tie cords along the top edge of the shroud are then tied around the tree. Next, a draw cord positioned along the lower edge of the shroud is then tightened and tied around the tree trunk thereby effectively concealing the hunter's lower body movements as he awaits in the tree stand for game animals.

DETAILED DESCRIPTION OF THE PREFERRED EMBODIMENT

Figure 1:
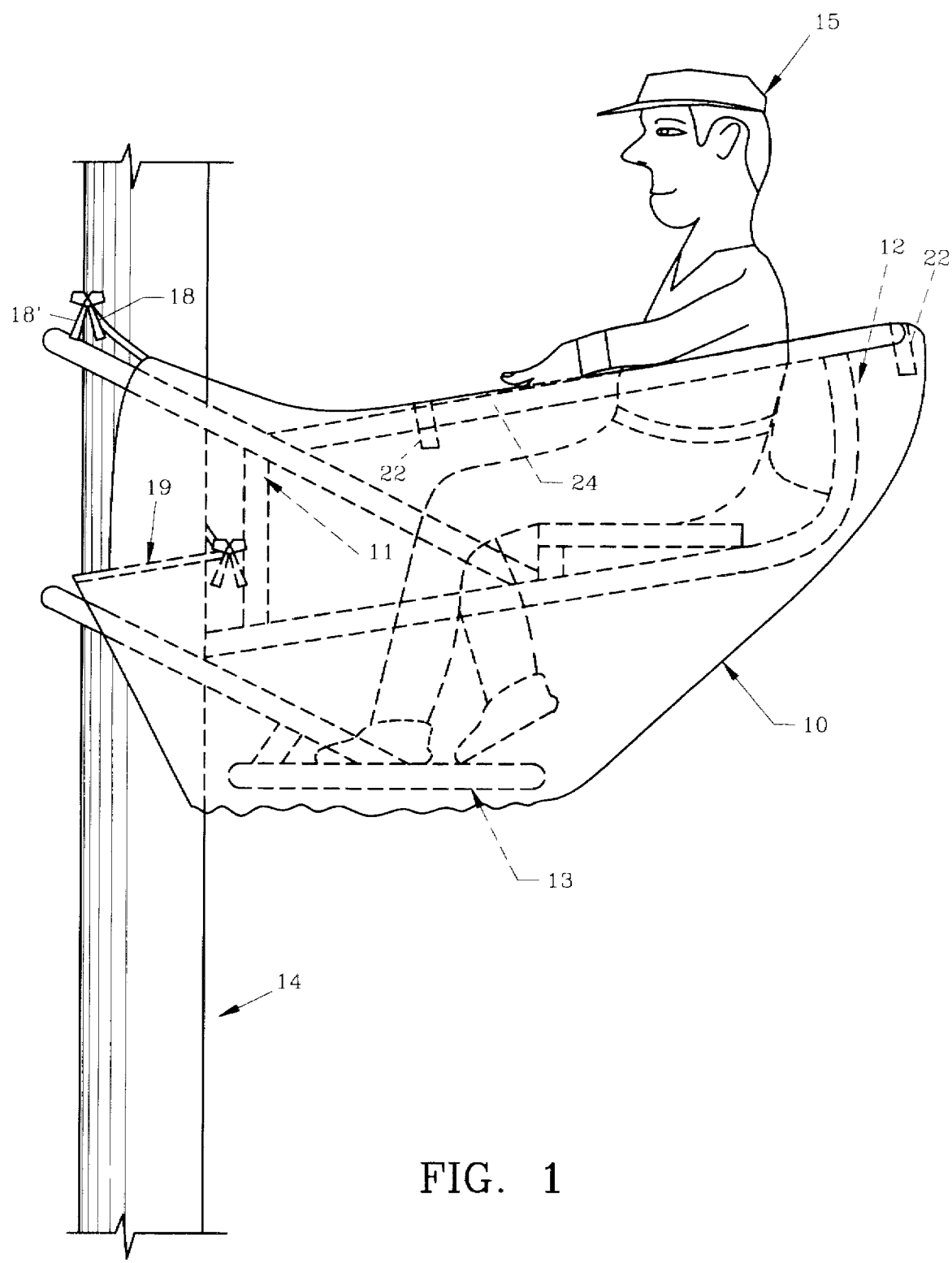
FIG. 1 demonstrates a side view of the shroud of the invention in combination with a climbable tree stand seen in ghost fashion.
Figure 2:
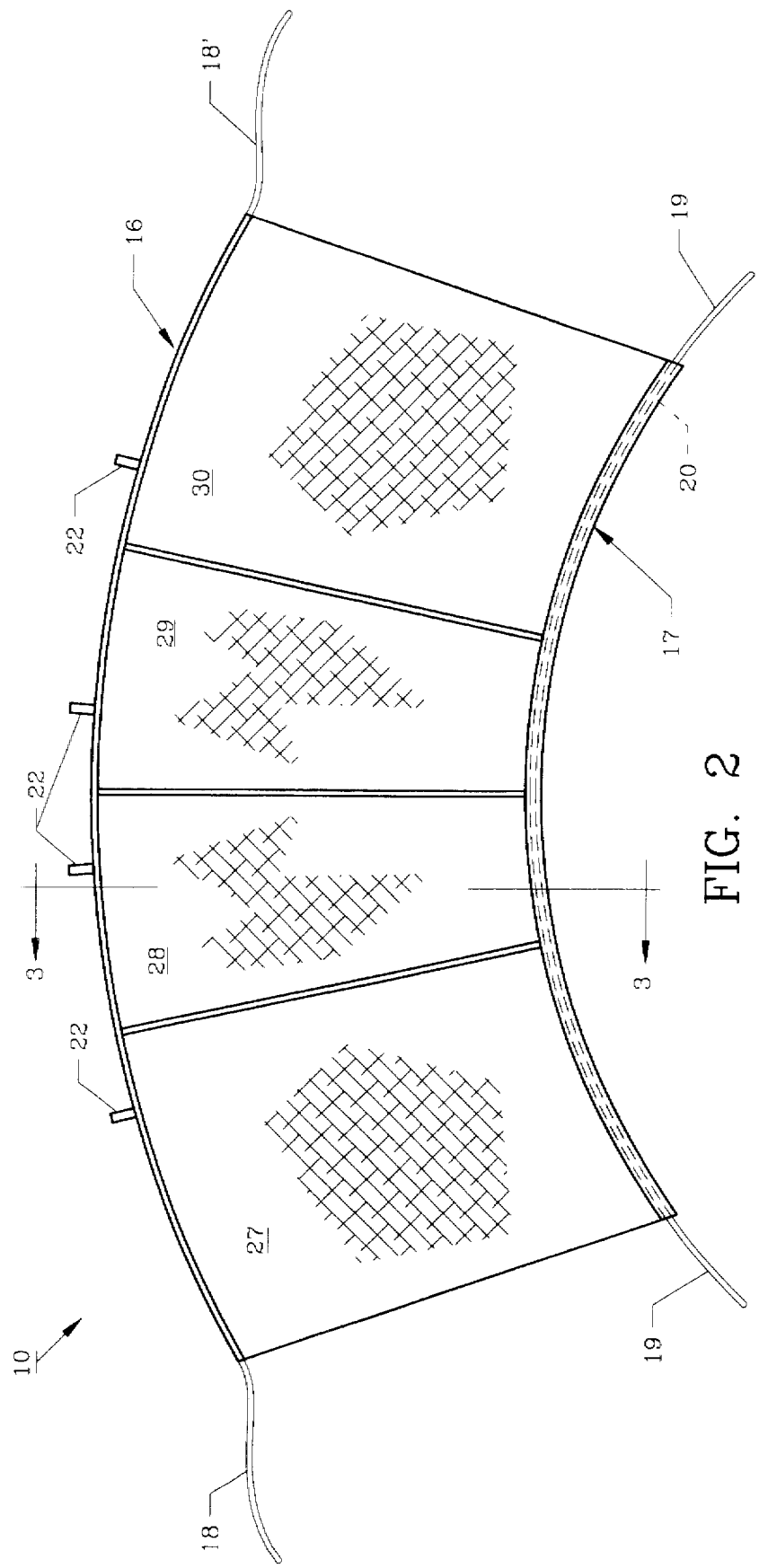
FIG. 2 illustrates the shroud in open form, removed from the tree stand.
Figure 3:
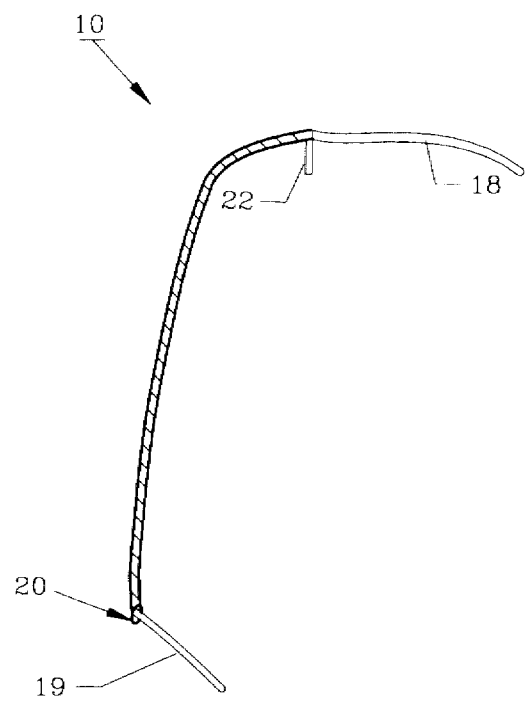
FIG. 3 shows the shroud as shown in FIG. 2 along lines 3—3.
Figure 4:
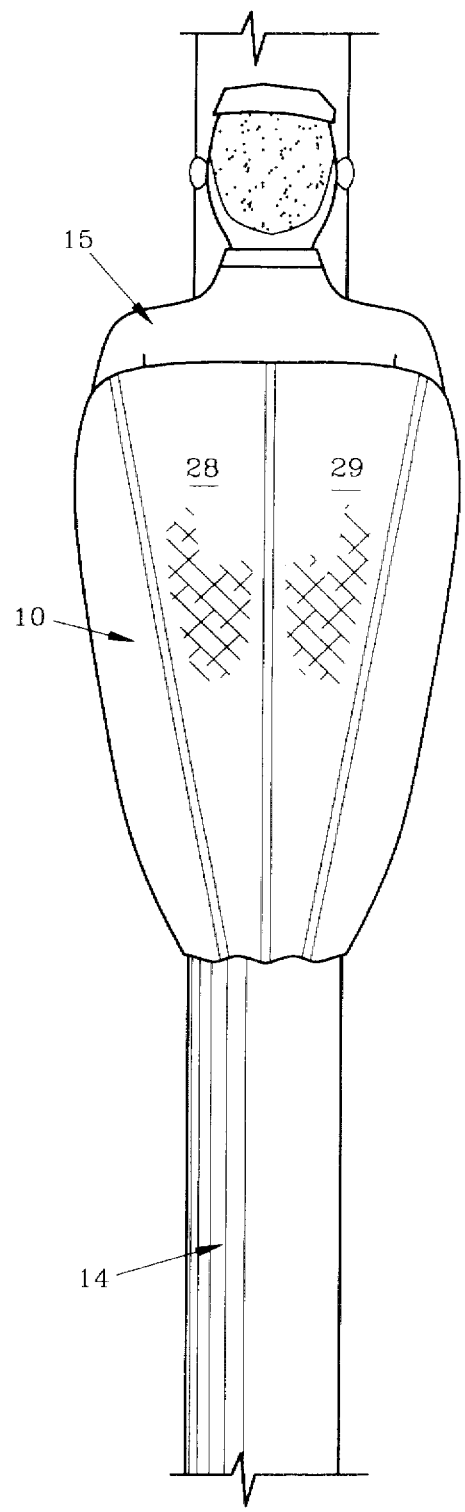
FIG. 4 depicts the shroud covering a tree stand as seen from the rear.

For a better understanding of the invention and its operation, turning now to the drawings, FIG. 1 illustrates the preferred form of shroud 10 in combination with climbable tree stand 11 shown in ghost fashion. Shroud 10 is attached to conventional, two-section tree stand 11 which is known in the industry as a "climbable" tree stand in that seat section 12 is not rigidly affixed to footrest section 13. Rather, seat section 12 and footrest section 13 are independently movable and positionable along tree trunk 14 whereby a hunter can maneuver sections 12 and 13 independently along tree trunk 14 to climb or descend as necessary. As further shown in FIGS. 1 and 4, shroud 10 does not completely conceal the upper body portion of seated hunter 15 but mainly conceals his lower body portion, and prevents wild game from being frightened from foot and leg movements as may be made by hunter 15 as he awaits game in tree stand 11. Shroud 10 as seen open and unattached in FIG. 2 has a slightly arcuate upper or top edge 16 and a curved lower or bottom edge 17. At opposite ends of top edge 16 are affixed tie cords 18, 18' which can be tied at a convenient, desired location around tree trunk 14. To conceal the hunter's feet and lower legs, draw cord 19 is provided along bottom edge 17 within raw cord channel 20 shown in FIG. 3. The curved surfaces of shroud 10 are clearly depicted in FIG. 3 as shroud 10 consists of a flexible panel sewn from segments 27, 28, 29, 30 preferably from woven, waterproof camouflage fabric such as is manufactured from nylon or other durable synthetic fibers. Shroud 10 may also be formed from a conventional netting material likewise having a camouflage appearance. As seen in FIG. 2, releasable hook and loop (Velcro) straps 22 are affixed along top edge 16 of shroud 10. Releasable straps 22 can be releasably secured to armrest 24 and armrest 24' (not shown) in FIG. 1 of seat section 12.

In use, shroud 10 is affixed by releasable straps 22 to armrest 24, 24' of tree stand 11 with footrest 13 and seat section 12 positioned at approximately ground level along tree trunk 14. Hunter 15 then positions himself on tree stand 11 and "walks" tree stand 11 upwardly to the desired height by first lifting seat section 12 along tree trunk 14 and then elevating footrest section 13, each section, one at a time, until the appropriate hunting elevation is attained. Once tree stand 11 is at the desired height, tie cords 18, 18' are then secured in place around tree trunk 14 and thereafter, draw cord 19 is pulled to gather bottom edge 17 of shroud 10 tightly around footrest section 13. The ends of draw cord 19 are secured such as by tying around tree trunk 14 thereby concealing the lower body portion of hunter 15 from view.

After hunting has terminated draw cord 19 and tie cords 18, 18' are loosened and the hunter can then "walk" tree stand 11 downwardly along tree trunk 14 and once on the ground shroud 10 can be removed and tree stand 11 disassembled and removed for storage or transportation purposes.

As hereinbefore explained, shroud 10 is formed from a flexible material and can be easily folded into a small package of approximately 10×10 inches in size and having a thickness of approximately two (2) inches.

The illustrations and examples provided herein are for explanatory purposes to illustrate the preferred form and are not intended to limit the scope of the appended claims.

I claim:

1. A hunter's tree stand and portable shroud in combination for attachment to a tree trunk, comprising:
   (a) a climbable tree stand having separate seat and foot rest sections; and
   (b) a flexible fabric shroud, said shroud surrounding said seat and said foot sections, said shroud surrounding said tree trunk, said shroud comprising means to attach said shroud to said tree stand, and means to directly attach said shroud to said tree trunk, said tree trunk attachment means joined to said shroud, whereby said tree stand is concealed by said shroud.

2. The combination of claim 1 wherein said tree stand attaching means comprises a hook and loop fastener.

3. The combination of claim 1 wherein said shroud comprises a top and a bottom edge, and a hook and loop fastener, said hook and loop fastener attached along said top edge for releasably affixing said shroud to said seat section.

4. The combination of claim 3 wherein said shroud comprises a tie cord, said tie cord attached to said top edge.

5. The combination of claim 3 wherein said bottom edge of said shroud defines a draw cord channel.

6. The combination of claim 5 and including a draw cord, said draw cord disposed within said draw cord channel.

7. A portable shroud in combination with a hunter's tree stand for attachment to a tree trunk, said combination comprising: a hunter's tree stand, shroud, said shroud comprising a flexible panel, said panel having top and bottom edges, means to directly attach said shroud to said tree trunk, said tree trunk attachment means joined to said shroud, means for attaching said shroud to said tree stand, said shroud attaching means joined to said shroud, said shroud for placement around said tree stand to conceal said tree stand, and said shroud for attachment to said tree trunk so as to surround said tree trunk.

8. The combination of claim 7 wherein said bottom edge defines a draw cord channel, a draw cord, said draw cord disposed within said channel for gathering said shroud around said tree trunk.

9. The combination of claim 7 wherein said shroud attaching means comprises a tie cord, said tie cord attached proximate said top edge.

10. The combination of claim 7 wherein said shroud attaching means comprises a releasable fastener, said releasable fastener attached to said top edge.

11. The combination of claim 7 wherein said shroud is formed of camouflage fabric.

12. The combination of claim 7 wherein said flexible panel comprises a camouflage netting.

13. The shroud of claim 10, wherein said releasable fastener comprises a hook and loop fastener.

* * * * *